United States Patent
Chen et al.

(10) Patent No.: US 10,998,617 B2
(45) Date of Patent: May 4, 2021

(54) IN-VEHICLE TELEMATICS BLADE ARRAY AND METHODS FOR USING THE SAME

(71) Applicant: Byton Limited, Hong Kong (HK)

(72) Inventors: Abraham Tai-Yu Chen, San Jose, CA (US); Trampus Richmond, Santa Cruz, CA (US); William Christopher Adler, Santa Cruz, CA (US)

( * ) Notice: Subject to any disclaimer, the term of this patent is extended or adjusted under 35 U.S.C. 154(b) by 0 days.

(21) Appl. No.: 15/863,769

(22) Filed: Jan. 5, 2018

(65) Prior Publication Data

US 2019/0214711 A1 Jul. 11, 2019

(51) Int. Cl.
*H01Q 1/32* (2006.01)
*H04W 4/44* (2018.01)
(Continued)

(52) U.S. Cl.
CPC ........... *H01Q 1/3275* (2013.01); *H01Q 1/241* (2013.01); *H04B 1/3822* (2013.01); *H04W 4/44* (2018.02); *H04W 88/06* (2013.01)

(58) Field of Classification Search
CPC ....... H01Q 1/3275; H01Q 1/241; H04W 4/44; H04W 88/06
See application file for complete search history.

(56) References Cited

U.S. PATENT DOCUMENTS 5,594,453 A * 1/1997 Rodal .................. G01S 19/235
    342/352
5,825,096 A 10/1998 Morimoto et al.
(Continued)

FOREIGN PATENT DOCUMENTS

DE      19653431 A1    7/1997
DE  202017101968 U1    9/2017
(Continued)

OTHER PUBLICATIONS

The International Search Report for PCT Application No. PCT/US2018/068061 dated Apr. 11, 2019. 3 pages.
(Continued)

*Primary Examiner* — Mohammed Rachedine
(74) *Attorney, Agent, or Firm* — Womble Bond Dickinson (US) LLP

(57) ABSTRACT

Methods and systems are disclosed for user recognition and express for an automobile. For one example, a data processing system for an automobile includes a database, a user capture device, and a computer. The database stores at least an image of a user of the automobile. The user capture device captures at least an image of the user. The computer is coupled to the database and the user capture device. The computer allows the user access to the automobile if the user is authenticated as a valid user by determining if stored image of the user match the captured image of the user. The facial features can include two-dimensional (2D) or three-dimensional (3D) images including facial features. The computer allows the user access to the automobile and controls of the automobile if the user is authenticated as a valid user. The computer can also deny the user access to the automobile and controls of the automobile if the user is not authenticated as a valid user. The user can be a driver or a passenger of the automobile. The computer can also configure settings or preferences for the driver or passenger if authenticated as a valid user.

23 Claims, 5 Drawing Sheets

(51) Int. Cl.
*H01Q 1/24* (2006.01)
*H04W 88/06* (2009.01)
*H04B 1/3822* (2015.01)

(56) References Cited

U.S. PATENT DOCUMENTS

| | | | | |
|---|---|---|---|---|
| 7,010,307 | B2* | 3/2006 | Abraham | G01S 19/235 |
| | | | | 331/158 |
| 8,175,291 | B2* | 5/2012 | Chan | G10L 21/0208 |
| | | | | 381/94.7 |
| 8,554,896 | B2* | 10/2013 | Sodergren | G05B 19/0423 |
| | | | | 709/203 |
| 2006/0104249 | A1* | 5/2006 | Karaoguz | H04M 1/2535 |
| | | | | 370/338 |
| 2007/0057843 | A1* | 3/2007 | Chang | H01Q 3/2605 |
| | | | | 342/368 |
| 2007/0171137 | A1 | 7/2007 | Mierzwa et al. | |
| 2009/0267387 | A1 | 10/2009 | Leroy et al. | |
| 2013/0329364 | A1* | 12/2013 | Kameno | H05K 7/20563 |
| | | | | 361/697 |
| 2016/0094695 | A1* | 3/2016 | Su | H01Q 1/243 |
| | | | | 455/552.1 |
| 2016/0194014 | A1* | 7/2016 | Rajendran | B61L 27/0005 |
| | | | | 701/2 |
| 2017/0054204 | A1 | 2/2017 | Changalvala et al. | |
| 2017/0305242 | A1 | 10/2017 | Gallagher et al. | |
| 2018/0037267 | A1 | 2/2018 | Williams et al. | |
| 2019/0210546 | A1 | 7/2019 | Slovesko | |

FOREIGN PATENT DOCUMENTS

| | | |
|---|---|---|
| GB | 2547973 A | 9/2017 |
| JP | 2003017916 A | 1/2003 |

OTHER PUBLICATIONS

The Written Opinion of the International Searching Authority for PCT Application No. PCT/US2018/068061 dated Apr. 11, 2019, 5 pages.

The International Search Report and Written Opinion of the International Searching Authority for PCT Application No. PCT/US2018/058593 dated Feb. 15, 2019, 11 pages.

The Non-Final Office Action of U.S. Appl. No. 15/863,789, dated Mar. 39, 2019, 7 pages.

The Final Office Action of U.S. Appl. No. 15/863,789, dated Sep. 30, 2019, 9 pages.

* cited by examiner

IN-VEHICLE TELEMATICS BLADE ARRAY AND METHODS FOR USING THE SAME

FIELD

Embodiments of the invention are in the field of vehicles and communications and communication equipment. More particularly, embodiments of the invention relate to in-vehicle telematics blade array and methods for using the same.

BACKGROUND

Automobiles are manufactured typically with a single antenna, e.g., a shark fin antenna, on the roof of the automobile mainly to receive radio signals (e.g., AM and FM) for a radio device. If other communication devices used for the automobile, additional antenna are physically mounted on top of the roof such as additional shark fin antenna or vertical antenna to provide the necessary signals or services needed. Adding such antennae clutters the roof and is unappealing to view.

SUMMARY

In-vehicle telematics blade array and methods for using the same are disclosed. For one example, an automobile includes a roof structure, an antenna system, and an automotive telematics blade array (ATBA). The antenna system is attached to the roof structure. The ATBA is integrated into the roof structure and coupled to the antenna system. The ATBA includes a plurality blades. Each blade provides connectivity for the automobile using the antenna system, wherein each blade can provide WiFi, Bluetooth or cellular connectivity. The plurality of blades includes a modem to provide WiFi, Bluetooth or cellular connectivity.

For one example, the ATBA includes one or more processors to aggregate multiple connectivity devices for the automobile including WiFi, Bluetooth and cellular devices. The one or more processors can provide a mesh network or vehicle to infrastructure (V2X) connectivity over WiFi. The ATBA also includes a plurality of slots. Each blade in the ATBA is coupled to a respective slot, and one of the slots includes an expansion slot to receive a blade to provide connectivity for the automobile. For one example, the antenna system includes a plurality of flat antenna attached to the roof of the vehicle. The ATBA includes a plurality of output ports, and each output port can be coupled to a respective flat antenna of the antenna system. The ATBA can be a box integrated into the roof structure.

For one example, an in-vehicle method includes connecting a telematics blade array to an antenna system attached to a roof structure of a vehicle; communicating WiFi, Bluetooth, or cellular signals using the antenna system from the telematics blade array; and providing WiFi, Bluetooth, or cellular signals from the antenna system to one or more devices operating within the vehicle. A blade can be added to the telematics blade array in an expansion slot. The added blade can be coupled to the antenna system attached to the roof structure of the vehicle. Connectivity for WiFi, Bluetooth and cellular devices can be aggregated within the vehicle using the telematics blade array.

Other apparatuses, methods and systems are described.

BRIEF DESCRIPTION OF THE DRAWINGS

The appended drawings illustrate examples and are, therefore, exemplary embodiments and not considered to be limiting in scope.

DETAILED DESCRIPTION

Figure 1:
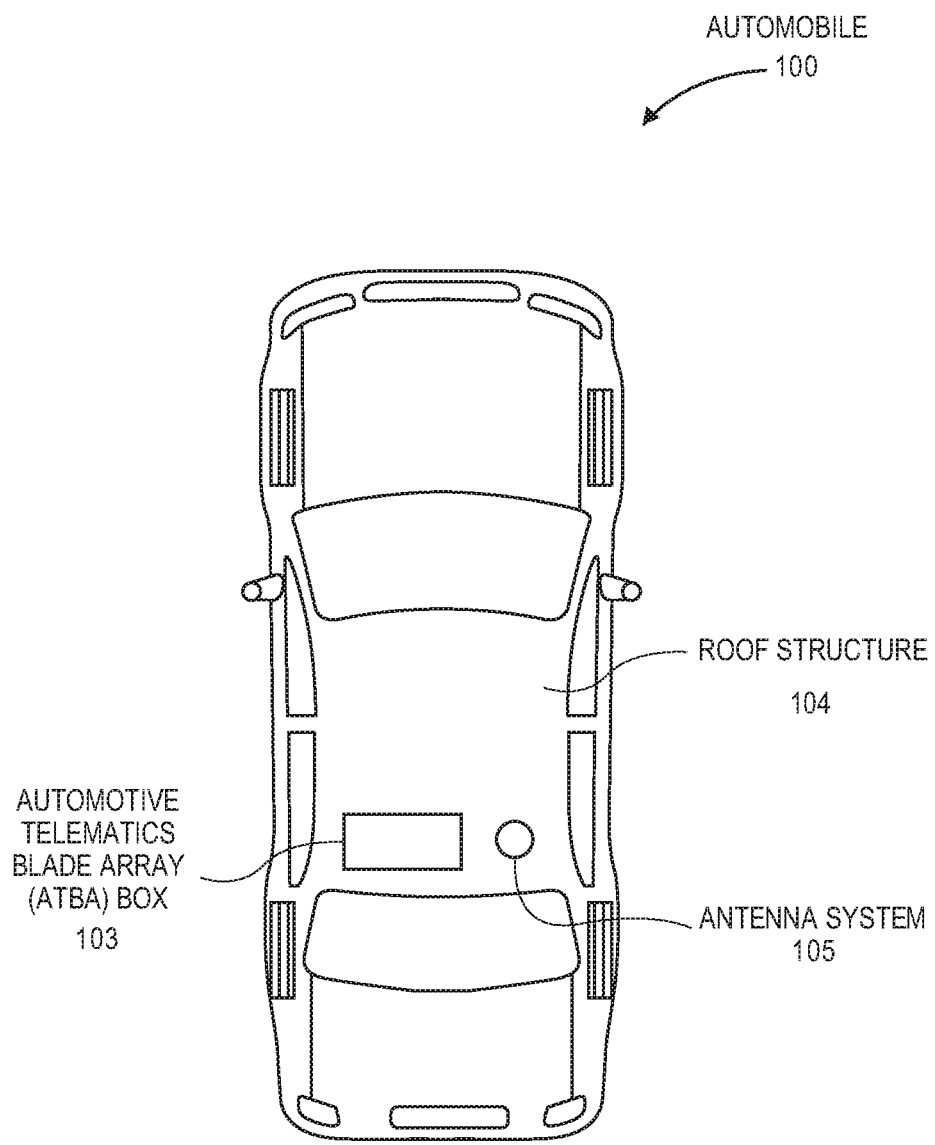
FIG. 1 illustrate one example of a top view of an automobile having a roof structure with an automotive telematics blade array (ATBA).

Embodiments and examples are disclosed for user recognition and expression for an automobile such electric or non-electric automobiles including self-driving or autonomous automobiles. For one example, an automobile includes a roof structure, an antenna system, and an automotive telematics blade array (ATBA). The antenna system is attached to the roof structure. The ATBA is integrated into the roof structure and coupled to the antenna system. The ATBA includes a plurality blades. Each blade provides connectivity for the automobile using the antenna system, wherein each blade can provide WiFi, Bluetooth or cellular connectivity. The plurality of blades includes a modem to provide WiFi, Bluetooth or cellular connectivity.

For one example, the ATBA includes one or more processors to aggregate multiple connectivity devices for the automobile including WiFi, Bluetooth and cellular devices. The one or more processors can provide a mesh network or vehicle to infrastructure (V2X) connectivity over WiFi. The ATBA also includes a plurality of slots. Each blade in the ATBA is coupled to a respective slot, and one of the slots includes an expansion slot to receive a blade to provide connectivity for the automobile. For one example, the antenna system includes a plurality of flat antenna attached to the roof of the vehicle. The ATBA includes a plurality of output ports, and each output port can be coupled to a respective flat antenna of the antenna system. The ATBA can be a box integrated into the roof structure.

Although the following examples and embodiments are directed to an automotive telematics blade array (ATBA), the ATBA can be used for any type of vehicle such as aircraft and marine vehicles requiring wireless communications such as WiFi, Bluetooth (BT), or cellular communications. The disclosed ATBA can provide WiFi, Bluetooth or cellular connectivity and related protocols such as: Global System for Mobile Communications (GSM), General Packet Radio Service (GPRS), CDMAOne, CDMA2000, Evolution-Data Optimized (EV-DO), Enhanced Data Rates for GSM Evolution (EDGE), Universal Mobile Telecommunications System (UMTS), Digital Enhanced Cordless Telecommunications (DECT), Digital AMPS (IS-136/TDMA), Integrated Digital Enhance Network (iDEN), etc. and protocols including IEEE 802.11 wireless protocols, long-term evolution LTE 3G+ protocols, and Bluetooth and Bluetooth low energy (BLE) protocols.

As set forth herein, various embodiments, examples and aspects will be described with reference to details discussed below, and the accompanying drawings will illustrate various embodiments and examples. The following description and drawings are illustrative and are not to be construed as limiting. Numerous specific details are described to provide a thorough understanding of various embodiments and examples. However, in certain instances, well-known or conventional details are not described in order to provide a concise discussion of the embodiments and examples.

Automotive Telematics Blade Array (ATBA) Example

FIG. 1 illustrate one example of a top view of an automobile 100 having a roof structure 104 with an automotive telematics blade array (ATBA) box 103 that can be coupled to antenna system 103. Automobile 100 can be an electric or non-electric vehicle including self-driving or autonomous vehicles. Antenna system 105 can be attached, embedded or formed on roof structure 104 and include a plurality of flat antennae. For one example, ATBA box 103 is integrated into roof structure 104 and coupled to antenna system 102 in providing WiFi, Bluetooth or cellular connectivity. For one example, ATBA box 103 includes a slide-in chassis and can be expandable to accommodate connectivity to new technology, standards or services. For example, if a user of automobile 100 has a new carrier service, a blade can be added to ATBA 103 to connect to the new service providing connectivity within automobile 100.

Figure 2:
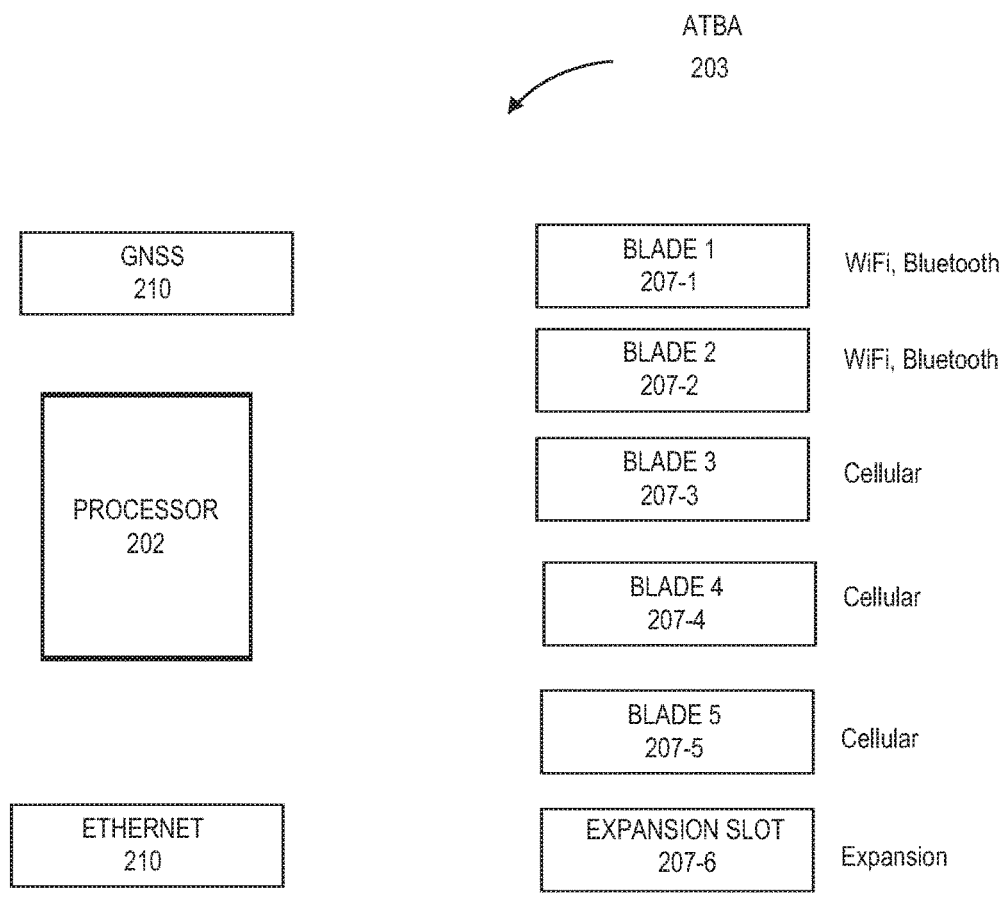
FIG. 2 illustrates one example of the basic components of the ATBA system.
Figure 3:
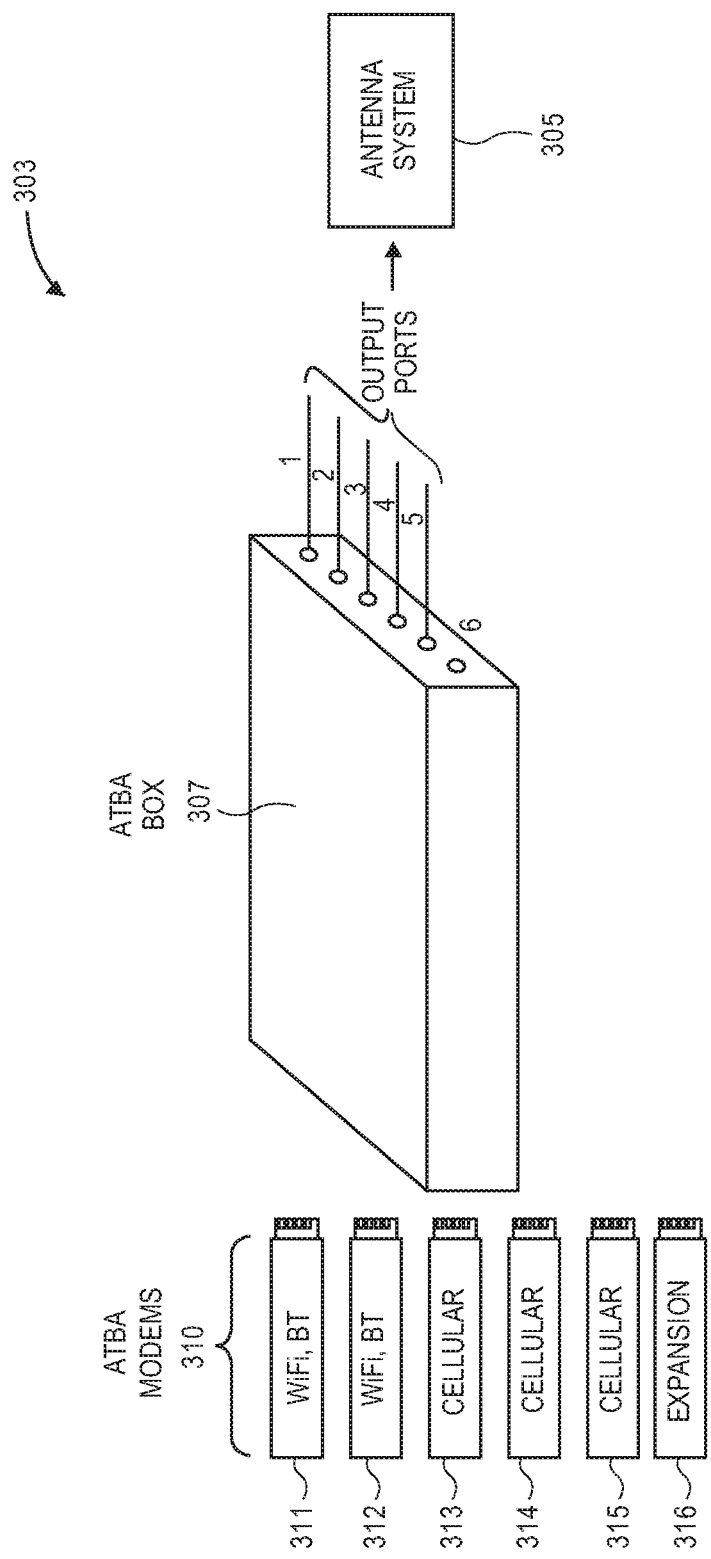
FIG. 3 illustrates one example of the ATBA box coupled to an antenna system.

For example, ATAB box can include a plurality of slots on the slide-in chassis to removable blades as described in FIGS. 2-3. One or more of the slots can be reserved for as an expansion slot to receive a blade in the future, e.g., if connectivity to a new carrier is needed or an upgrade in technology is require, a blade can be added to provide necessary connectivity. For one example, the blades in ATBA box 103 can include modems to provide WiFi, Bluetooth or cellular communication and connectivity for automobile 100 using antenna system 105. ATBA box 103 can aggregate multiple connectivity devices for the automobile including WiFi, Bluetooth and cellular devices used within automobile 100. For one example, ATBA box 103 can provide a mesh network or vehicle to infrastructure (V2X) connectivity over WiFi.

Exemplary ATBA Components

FIG. 2 illustrates one example of the basic components of the ATBA system 203. ATBA 203 can include a slide-in chassis (not shown) have a plurality of slots for a plurality of blades to support different connectivity mediums and a backup battery (not shown). For example, referring to FIG. 2, five blades are shown as blades 1-5 (207-1 through 207-5) which can be situated on slide-in chassis of a gigabit data rate backplane of ATBA 203 (e.g., 10 gigabits/s data rate). Blades 1-5 (207-1 through 207-5) can include modems to provide WiFi, Bluetooth, or cellular connectivity. In this example, 2 blades (blades 1 and 2) provide WiFi and Bluetooth connectivity and 3 blades (blades 4, 5 and 6) provide cellular connectivity. For one example, blades 1 or 2 can be used for V2X connectivity and the other blade can be used for BLE communication with BLE devices within the vehicle.

For one example, although five blades are shown, ATBA 23 can have any number of blades and each blade can be removed and replaced on the slide-in chassis. Expansion slot (207-6) is empty to receive a blade in the future if a new service or carrier is added or an upgrade for a carrier or technology is need. In such a case, a blade can be added to the slide-in chassis of ATBA 203. Similarly, although one expansion slot is shown, ATBA can have any number of expansion slots to receive a new blade. For one example, each blade 1-5 connects to an output port of ATBA 203 to antenna system, e.g., antenna system 105.

For one example, ATBA 202 includes a processor 202 which can represent a single processor or multiple processors which can be any type of core processor. Examples of processor 202 can include the NXP iMX6® processor or the ARM Cortex® processor which can be configured to provide connectivity using blades 1-5 (207-1 through 207-5) in providing WiFi, Bluetooth or cellular communications using an antenna system. For one example, processor 202 can be configured to provide in-vehicle or local secure access or logging-in to access ATBA 202. For one example, processor 202 can be configured to provide mesh networking communication and vehicle to infrastructure (V2X) connectivity to allow automobile 100 to communicate with moving devices. For one example, processor 202 can be configured to provide load balancing for communications using ATBA 203, which can provide gigabit data rate for automobile 100 (e.g., 1 gigabit/s).

For example, blades 4, 5 and 6 can provide cellular connectivity and each blade can be designated for a separate cellular service carrier or separate contracts using a single carrier service, processor 202 can then balance communication among blades 4, 5 and 6 to ensure a minimum data rate for automobile 100, e.g., 1-gigabit/s. Processor 202 can be coupled to an Ethernet interface 210 to provide Ethernet networking capabilities and to connect to a Gateway for automobile 100. Processor 202 can also be coupled to a Global Navigation Satellite System (GNSS) interface to communicate with satellite navigation systems that can provide autonomous geo-spatial positioning.

Exemplary ATBA Box

FIG. 3 illustrates one example of the ATBA system 303 with a ATBA box 307. ATBA box 307 can receive a plurality of blades having ATBA modems 310. Modems 311 through 315. Modems 311 and 312 can be WiFi and Bluetooth (BT) modems and modems 313 through 315 can be cellular modems. Modem 316 represents a modem that can be inserted into an expansion slot. ATBA box 307 includes output ports 1-5. Each output port 1-5 is connected to a respective modem 311 through 315. If expansion modem is added to ATBA box 307, output port 6 can then be coupled to antenna system 305. Expansion modem 316 can be a WiFi, BT or cellular modem. For one example, ATBA box 307 and antenna system can be in close proximity to each other on the roof structure and further away depending on the length of connection cables to couple output ports 1-6 to antenna system 305.

Exemplary ATBA Operation

Figure 4:
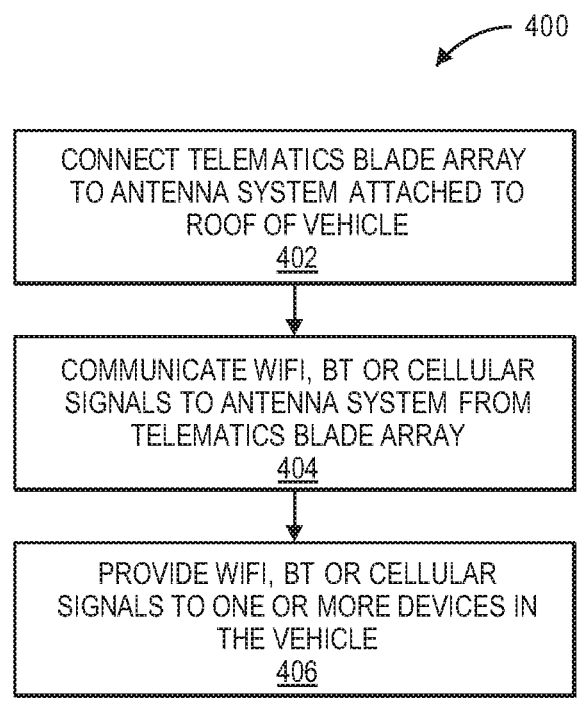
FIG. 4 illustrates one example of a flow diagram of an operation for an ATBA in a vehicle.

FIG. 4 illustrates one example of a flow diagram of an operation 400 for an ATBA in a vehicle. Operation 400 includes operations 402, 404 and 406. At operation 402, a telematics blade array (e.g., ATBA 103, 203 and 303) is connected to an antenna system (e.g., 105 and 305) of a vehicle (e.g., 100). At operation 404, WiFi, Bluetooth or cellular signals are communicated between antenna system and the telematics blade array. At operation 406, WiFi, Bluetooth or cellular signals are provided to one or more devices in the vehicle. The devices can be, e.g., mobile phones, table computers, laptop computers, smart watches, wearables, etc. If a new carrier service or a technology upgrade is required to operate devices within the vehicle, a new blade can be inserted into the telematics blade array to provide a new connectivity for the new carrier service or upgrade.

Exemplary Data Processing or Computing System

Figure 5:
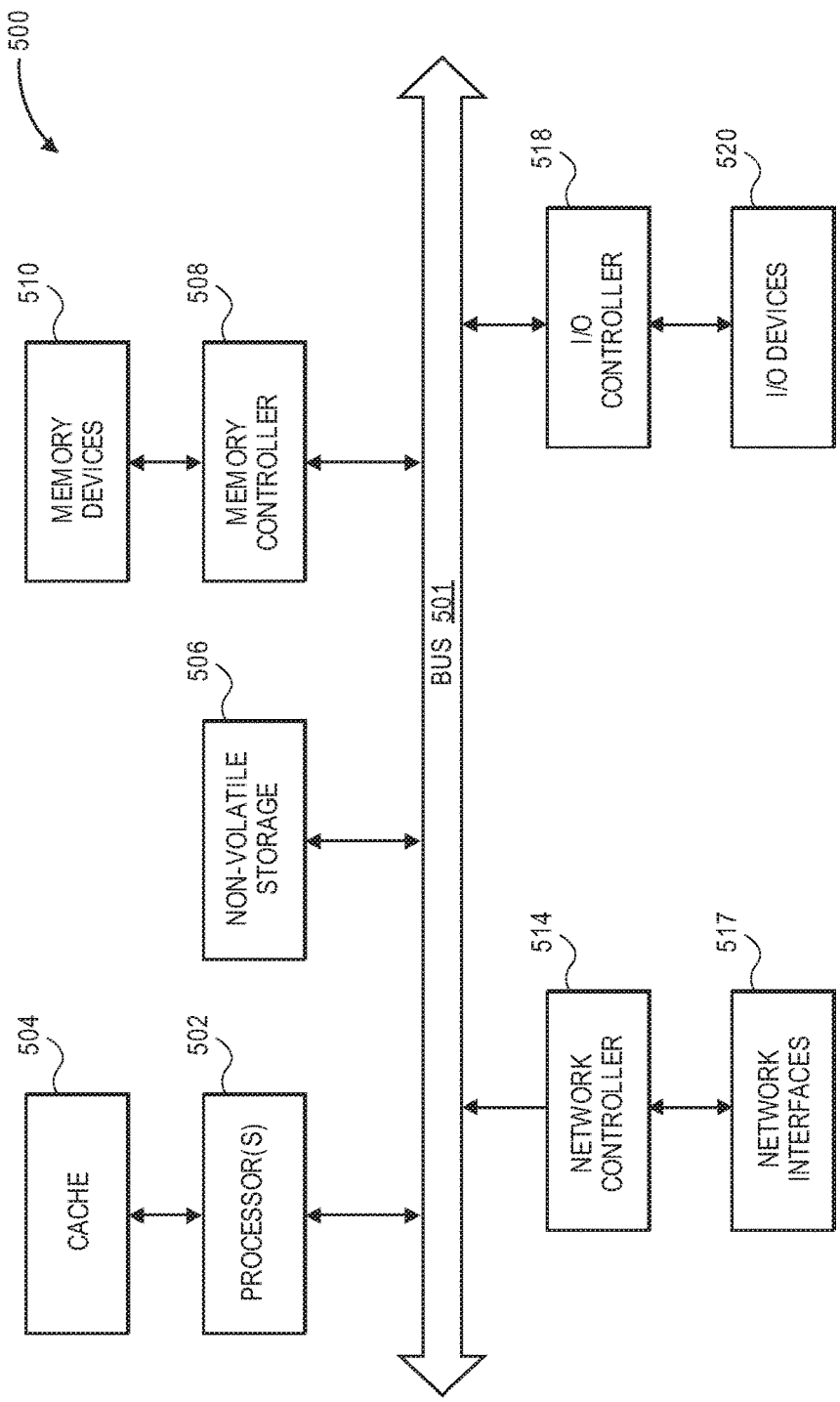
FIG. 5 illustrates one example of a data processing system or computing system.

FIG. 5 illustrates one example of a data processing system or computing system 500, which can be used for a telematics blade array as disclosed in FIGS. 2-3 or a WiFi, Bluetooth or cellular device. Although FIG. 5 illustrates various components of a data processing or computing system, the components are not intended to represent any particular architecture or manner of interconnecting the components, as such details are not germane to the disclosed examples or embodiments. Network computers and other data processing systems or other consumer electronic devices, which have fewer components or perhaps more components, may also be used with the disclosed examples and embodiments.

Referring to FIG. 5, computing system 500, which is a form of a data processing or computing system, includes a bus 503, which is coupled to processor(s) 502 coupled to cache 504, display controller 514 coupled to a display 515, network interface 517, non-volatile storage 506, memory controller coupled to memory 510, I/O controller 418 coupled to I/O devices 520, and database 512. Processor(s) 502 can include one or more central processing units (CPUs), graphical processing units (GPUs), a specialized processor or any combination thereof. Processor(s) 502 can retrieve instructions from any of the memories including non-volatile storage 506, memory 510, or database 512, and execute the instructions to perform operations described in the disclosed examples and embodiments.

Examples of I/O devices 520 include mice, keyboards, printers and other like devices controlled by I/O controller 518. Network interface 517 can include modems, wired and wireless transceivers and communicate using any type of networking protocol including wired or wireless WAN and LAN protocols including LTE and Bluetooth® standards. Memory 510 can be any type of memory including random access memory (RAM), dynamic random-access memory (DRAM), which requires power continually in order to refresh or maintain the data in the memory. Non-volatile storage 506 can be a mass storage device including a magnetic hard drive or a magnetic optical drive or an optical drive or a digital video disc (DVD) RAM or a flash memory or other types of memory systems, which maintain data (e.g. large amounts of data) even after power is removed from the system.

For one example, memory devices 510 or database 512 can bio-scan information for any number of users (e.g., drivers or passengers) for an automobile (e.g., automobile 110). Bio-scan information can include user images including 2D or 3D facial images and features and expressions. For other examples, memory devices 510 or database 512 can store user information of devices within the vehicle. Although memory devices 510 and database 512 are shown coupled to system bus 501, processor(s) 502 can be coupled to any number of external memory devices or databases locally or remotely by way of network interface 517, e.g., database 512 can be secured storage in a cloud environment. For one example, processor(s) 502 can implement techniques and operations described in FIGS. 1-4.

Examples and embodiments disclosed herein can be embodied in a data processing system architecture, data processing system or computing system, or a computer-readable medium or computer program product. Aspects, features, and details of the disclosed examples and embodiments can take the hardware or software or a combination of both, which can be referred to as a system or engine. The disclosed examples and embodiments can also be embodied in the form of a computer program product including one or more computer readable mediums having computer readable code which can be executed by one or more processors (e.g., processor(s) 402) to implement the techniques and operations disclosed in FIGS. 1-4.

In the foregoing specification, the invention has been described with reference to specific exemplary embodiments thereof. It will, however, be evident that various modifications and changes may be made thereto without departing from the broader spirit and scope of disclosed examples and embodiments. The specification and drawings are, accordingly, to be regarded in an illustrative rather than a restrictive sense.

What is claimed is:

1. An automobile comprising:
a roof structure and an antenna system attached to the roof structure; and
an automotive telematics blade array (ATBA) box integrated into the roof structure, the ATBA box including a plurality of output ports coupled to the antenna system and a plurality of slots and removable blades, each removable blade is coupled to a respective slot and output port providing connectivity for the automobile using the antenna system.

2. The automobile of claim 1, wherein each removable blade is to provide WiFi, Bluetooth or cellular connectivity.

3. The automobile of claim 2, wherein the plurality of removable blades include a modem to provide WiFi, Bluetooth or cellular connectivity.

4. The automobile of claim 2, wherein each removable blade of the ATBA box includes one or more processors to aggregate multiple connectivity devices for the automobile including WiFi, Bluetooth and cellular devices.

5. The automobile of claim 2, wherein the ATBA box is to provide a mesh network or vehicle to infrastructure (V2X) connectivity over WiFi.

6. The automobile of claim 1, wherein the plurality of slots of the ATBA box include an expansion slot to receive an additional removable blade to provide connectivity for the automobile.

7. The automobile of claim 1, wherein each output port of the ATBA box is coupled to a modem of a removable blade to provide WiFi, Bluetooth or cellular connectivity.

8. The automobile of claim 1, wherein the antenna system includes a plurality of flat antenna, each flat antenna corresponding to a respective removable blade of the ATBA box.

9. The automobile of claim 8, wherein each output port is coupled to a respective flat antenna of the antenna system.

10. The automobile of claim 1, wherein the ATBA box includes a slide-in chassis to receive the removable blades.

11. The automobile of claim 8, wherein the plurality of flat antenna are attached, embedded or formed on the roof structure.

12. An apparatus comprising:
a plurality of output ports coupled to an antenna system on a roof of a vehicle;
a plurality of slots coupled to the plurality of output ports; and
a plurality of removable blades mounted in the plurality of slots, each removable blade to provide a communication connectivity using the antenna system on the roof of the vehicle, and wherein the plurality of removable blades are housed in a box integrated into the roof of the vehicle.

13. The apparatus of claim 12, wherein each removable blade is to provide WiFi, Bluetooth or cellular connectivity.

14. The apparatus of claim 12, wherein the plurality of removable blades include a modem to modulate and receive modulated wireless signals.

15. The apparatus of claim 12, wherein the antenna system includes a plurality of flat antenna, each antenna corresponding to a respective removable blade housed in the box.

16. The apparatus of claim 15, wherein the plurality of flat antenna are attached, embedded or formed on the roof.

17. The apparatus of claim 12,
wherein each output port is coupled to a respective flat antenna of the antenna system.

18. The apparatus of claim 12, wherein at least one of the plurality slots is an expansion slot to receive a removable blade to provide connectivity for the vehicle.

19. An in-vehicle method comprising:
connecting a plurality of output ports of a telematics blade array box, the telematics blade array box having a plurality of removable blades mounted in respective slots coupled to the output ports, to an antenna system attached to a roof structure of a vehicle, wherein the telematics blade array box is integrated into the roof structure of the vehicle;
communicating WiFi, Bluetooth, or cellular signals using the antenna system and the telematics blade array box; and
providing WiFi, Bluetooth, or cellular signals from the antenna system to one or more devices operating within the vehicle.

20. The in-vehicle method of claim 19, further comprising:
adding a removable blade to the telematics blade array box in an expansion slot.

21. The in-vehicle method of claim 20, further comprising:
coupling the added removable blade to the antenna system attached to the roof structure of the vehicle.

22. The in-vehicle method of claim 19, comprising:
aggregating connectivity for WiFi, Bluetooth and cellular devices within the vehicle using the telematics blade array box.

23. The in-vehicle method of claim 19, wherein the antenna system includes a plurality of flat antenna attached, embedded or formed on the roof structure.

* * * * *